(12) United States Patent
Sheen

(10) Patent No.: US 9,962,783 B2
(45) Date of Patent: May 8, 2018

(54) GEAR HOBBING CUTTER WITH NON-CONSTANT WHOLE DEPTHS

(71) Applicant: Eaton Corporation, Cleveland, OH (US)

(72) Inventor: Benjamin S. Sheen, Schoolcraft, MI (US)

(73) Assignee: EATON CORPORATION, Cleveland, OH (US)

( * ) Notice: Subject to any disclaimer, the term of this patent is extended or adjusted under 35 U.S.C. 154(b) by 0 days. days.

(21) Appl. No.: 15/363,094

(22) Filed: Nov. 29, 2016

(65) Prior Publication Data

US 2017/0072486 A1    Mar. 16, 2017

Related U.S. Application Data

(60) Provisional application No. 62/004,536, filed on May 29, 2014.

(51) Int. Cl.
*B23F 21/16* (2006.01)
*B23F 5/22* (2006.01)
(Continued)

(52) U.S. Cl.
CPC ............ *B23F 21/16* (2013.01); *B23F 5/22* (2013.01); *B23F 15/00* (2013.01); *F16H 25/20* (2013.01);
(Continued)

(58) Field of Classification Search
CPC ........... Y10T 407/1715; Y10T 407/172; Y10T 407/1725; Y10T 407/173; Y10T 409/10159; Y10T 409/101749; B23F 5/22; B23F 5/24; B23F 21/16; B23F 21/163; B23F 21/166; B23F 21/18; B23F 21/183
(Continued)

(56) References Cited

U.S. PATENT DOCUMENTS 2,788,567 A     4/1957  Stibitz
2,864,153 A  *  12/1958 Mahan .................... B23F 21/16
                                                  407/26

(Continued)

FOREIGN PATENT DOCUMENTS

DE     102008037578 A1    5/2010

OTHER PUBLICATIONS

Schrader et al., "Manufacturing Processes & Materials", 2000, Fourth Edition, pp. 690-691.*
(Continued)

*Primary Examiner* — Erica E Cadugan
*Assistant Examiner* — Michael Vitale
(74) *Attorney, Agent, or Firm* — RMCK Law Group PLC

(57) ABSTRACT

A gear hobbing apparatus for producing a gear from a blank according to one example of the present disclosure can include a hob, a first series of hob teeth and a second series of hob teeth. The hob can have a cylindrical hob body. The first series of hob teeth can extend from the cylindrical hob body and have a first whole depth. The second series of hob teeth can alternately extend from the cylindrical hob body with the first series of hob teeth and have a second whole depth. The first and second whole depths are distinct and configured to create a gear from the blank that has adjacent teeth having distinct outer diameters.

19 Claims, 3 Drawing Sheets

(51) Int. Cl.
   *B23F 15/00* (2006.01)
   *F16H 25/20* (2006.01)
(52) U.S. Cl.
   CPC ............... *F16H 2025/209* (2013.01); *F16H 2025/2059* (2013.01); *F16H 2025/2084* (2013.01); *Y10T 407/1715* (2015.01); *Y10T 409/101749* (2015.01)
(58) Field of Classification Search
   USPC ............... 407/23, 24, 25, 26; 409/11, 12
   See application file for complete search history.

(56) References Cited

U.S. PATENT DOCUMENTS

| | | | |
|---|---|---|---|
| 3,374,518 A * | 3/1968 | Bentjens | B23F 21/16 407/26 |
| 3,715,789 A * | 2/1973 | Johnson | B23F 21/16 159/27.2 |
| 4,036,073 A | 7/1977 | Kitano | |
| 4,322,185 A * | 3/1982 | Tanimoto | B23F 21/16 407/23 |
| 2004/0064947 A1 | 4/2004 | Yanagimoto et al. | |
| 2008/0312019 A1 | 12/2008 | Ogo et al. | |

OTHER PUBLICATIONS

International Search Report and Written Opinion for International Application No. PCT/US2014/071899 dated May 8, 2015, 11 pages.
Australian Office Action for Application No. 2014395478 dated Jan. 30, 2018, 4 pages.

* cited by examiner

GEAR HOBBING CUTTER WITH NON-CONSTANT WHOLE DEPTHS

CROSS-REFERENCE TO RELATED APPLICATIONS

This application is a continuation of International Application No. PCT/US2014/071899 filed on Dec. 22, 2014, which claims the benefit of U.S. Patent Application No. 62/004,536 filed on May 29, 2014. The disclosure of the above application is incorporated herein by reference.

FIELD

The present disclosure relates generally to gear cutting tools and more specifically, to a gear hobbing apparatus for producing a gear from a blank.

BACKGROUND

Gears are typically cut from a work piece or blank during a tooth generating operation called hobbing. A hob cutter is designed to produce a tooth form with a given tooth height, pressure angle, and tooth thickness. All teeth produced with a typical hob cutter have the same tooth height, pressure angle, and tooth thickness. The shape of the features is described by a gear rack. A typical hob is cylindrical in shape and has helical cutting teeth. These teeth have grooves that run the length of the hob. The grooves can assist in cutting the blank and facilitate chip removal. During use, the teeth of the hob can be progressively cut into the work piece by a series of cuts made by the hob.

SUMMARY

A gear hobbing apparatus for producing a gear from a blank according to one example of the present disclosure can include a hob, a first series of hob teeth and a second series of hob teeth. The hob can have a cylindrical hob body. The first series of hob teeth can extend from the cylindrical hob body and have a first whole depth. The second series of hob teeth can alternately extend from the cylindrical hob body with the first series of hob teeth and have a second whole depth. The first and second whole depths are distinct and configured to create a gear from the blank that has adjacent teeth having distinct outer diameters.

According to additional features, the hob has a single start thread. According to other features, the hob has multiple start threads. The hob can have a first thread having a first rack profile and a second thread having a second rack profile. The first thread and the second threads are distinct. The first and second rack profiles are distinct. In other examples, a hob having three or more threads having three or more rack profiles is provided.

A gear hobbing apparatus for producing a gear from a blank constructed in accordance to additional features of the present disclosure includes a hob, a first tooth and a second tooth. The hob can have a cylindrical hob body and a cylindrical axis. The first tooth can extend from the cylindrical hob body and have a first diameter measured from the cylindrical axis and providing a first whole depth. The second tooth can extend adjacently from the cylindrical hob body from the first hob tooth and have a second diameter measured from the cylindrical axis and providing a second whole depth. The first and second diameters are equivalent. The first and second whole depths are distinct. The hob is configured to create a gear from the blank that has adjacent teeth having distinct outer diameters.

According to additional features, the gear hobbing apparatus can further include a first series of hob teeth having the first whole depth. The gear hobbing apparatus can further include a second series of hob teeth alternately extending from the cylindrical hob body with the first series of hob teeth. The second series of hob teeth can have the second whole depth.

According to other features, the hob has a single start thread. In other arrangements, the hob can have multiple start threads. The hob can have a first thread having a first rack profile and a second thread having a second rack profile. The first thread and the second thread are distinct. The first and second rack profiles are distinct.

A method of producing a gear from a gear blank having a gear blank axis according to one example of the present disclosure can include, providing a hob having (i) a cylindrical hob body having a hob axis, (ii) a first series of hob teeth extending from the cylindrical hob body and having a first whole depth and (iii) a second series of hob teeth alternately extending from the cylindrical hob body with the first series of hob teeth and having a second whole depth. The first and second whole depths are distinct. The hob can be translated across a circumferential face of the gear blank. The hob and the gear blank can rotate about their respective axes. The gear blank can be cut with the first and second series of hob teeth. The first and second hob teeth create a gear having adjacent teeth having distinct outer diameters.

The hob can have a single start thread in one example. The hob can have multiple start threads in another example. The hob can have a first thread having a first rack profile and a second thread having a second rack profile. The first thread and the second threads can be distinct. The first and second rack profiles can be distinct.

BRIEF DESCRIPTION OF THE DRAWINGS

The present disclosure will become more fully understood from the detailed description and the accompanying drawings, wherein.

DETAILED DESCRIPTION

Figure 1:
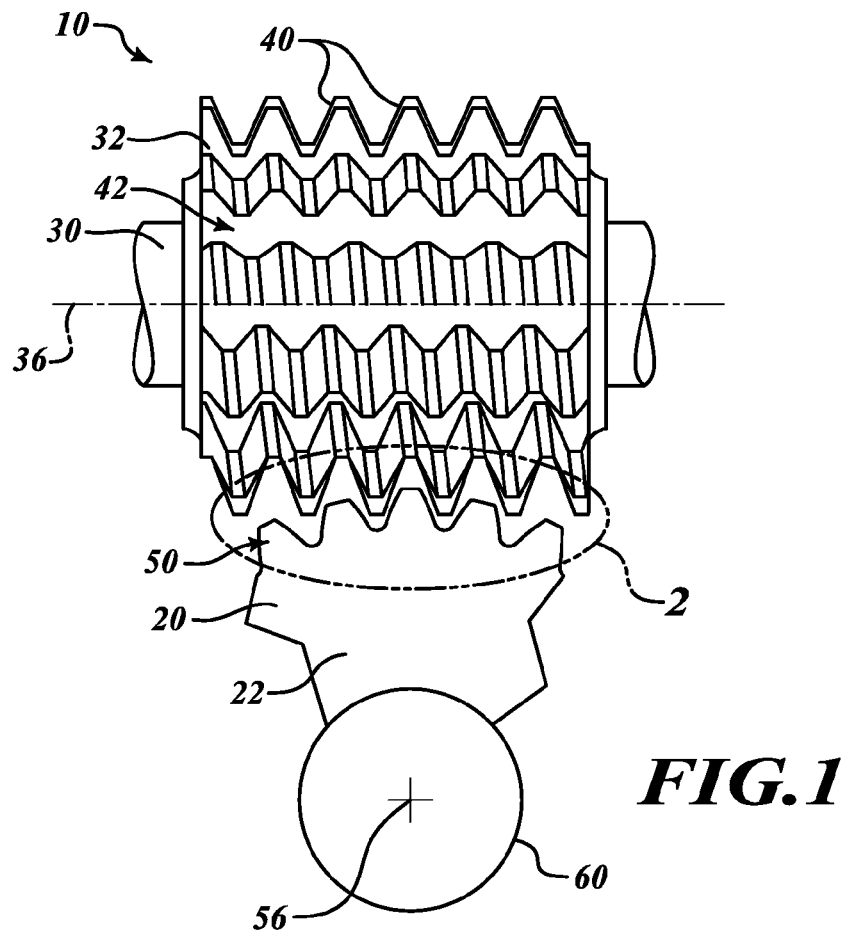
FIG. 1 is a side view of a hob constructed in accordance to one example of the present disclosure and shown forming a gear having gear teeth into a blank.
Figure 2:
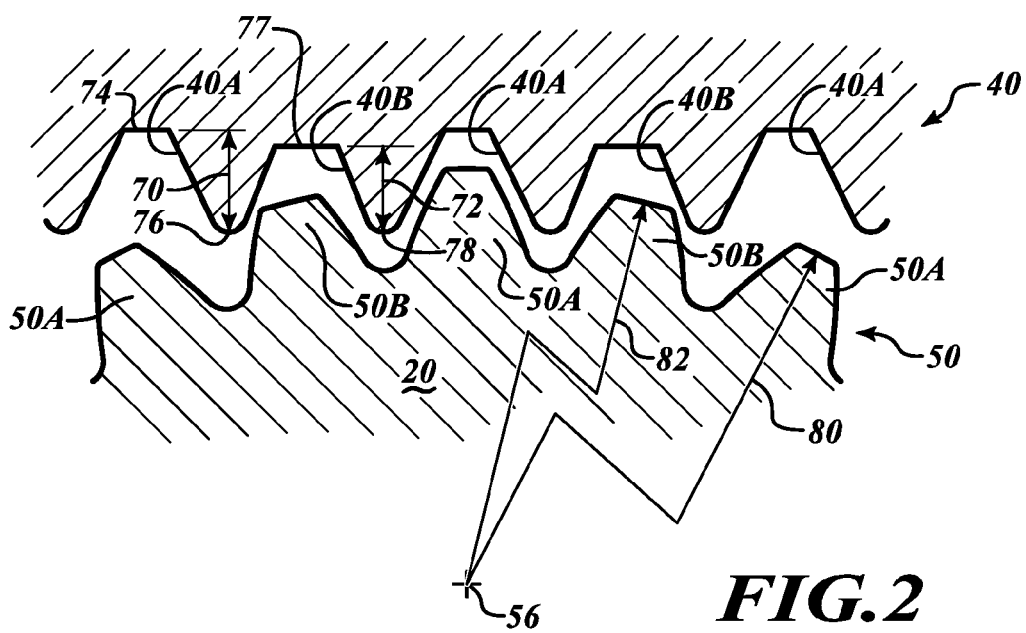
FIG. 2 is a detail view of the hob and blank of FIG. 1 and shown illustrating respective hob teeth and gear teeth.

With initial reference to FIGS. 1 and 2, a gear hobbing apparatus or hob constructed in accordance to one example of the present disclosure is shown and generally identified at reference numeral 10. The hob 10 can be constructed for producing a gear 20 from a work piece or blank 22. The hob 10 can be configured to rotate around a hob spindle 30. The hob 10 has a cylindrical hob body 32 that includes an axis 36 that is common to a rotational axis of the hob spindle 30.

The hob 10 can generally include hob teeth 40. Gashes 42 are formed longitudinally along the cylindrical hob body 32 between the hob teeth 40.

As will be described and become more fully appreciated from the following discussion, the hob 10 is used to form the gear 20 from the blank 22. In this regard, the gear 20 will have gear teeth 50 formed therearound. The blank 22 can be configured to rotate about a blank axis 56. The blank 22 can be mounted for rotation with a work piece spindle 60. As will be described in further detail herein, the gear 20 will be formed by the hob 10 in a manner such that not all of the gear teeth 50 will have the same outer diameter.

The hob 10 is constructed such that the teeth 50 having different outer diameters can be formed in a single operation without subsequent machining steps. In this regard, during the formation or hobbing of the gear 20, a first series of hob teeth 40A can be provided that have a whole depth 70 while a second series of hob teeth 40B have a whole depth of 72. The first whole depth 70 can generally be defined from a flute 74 on the hob 10 to a tip 76 on the first tooth 40A. Similarly, the whole depth 72 can be defined between a flute 77 and a tip 78 of the second tooth 40B. The whole depth 70 and the whole depth 72 are distinct. Moreover, because the flutes 74 and 77 are at distinct locations, the root diameter of the first and second series of hob teeth 40A and 40B varies. The varying root diameter allows for the cutting of the different tooth height teeth 50 in the gear 20.

In the example shown, the whole depth 72 is less than the whole depth 70. As a result, the gear teeth 50 that are formed by the hob 10 will have a first series of gear teeth 50A and a second series of gear teeth 50B. The first series of gear teeth 50A will have a diameter 80 measured from the axis 56. The gear teeth 50B will have a diameter 82 measured from the gear axis 56. According to the teachings of the present disclosure, the gear tooth 50A will have a diameter 80 that is greater than the diameter 82 of the gear tooth 50B.

Figure 3:
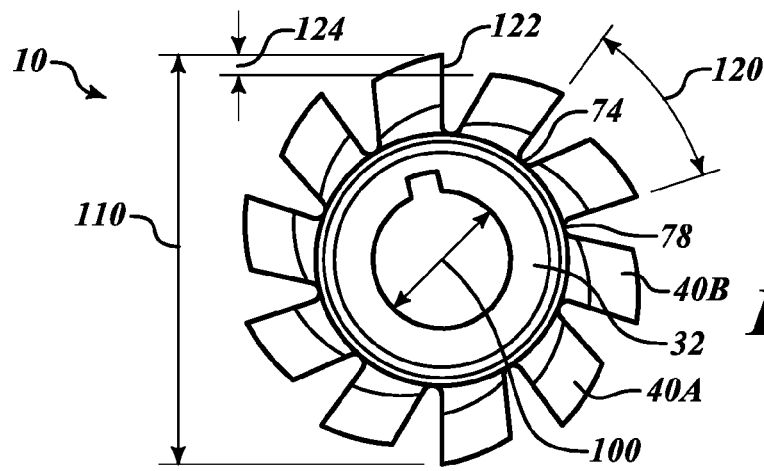
FIG. 3 is an axial view of the hob of FIG. 1.
Figure 4:
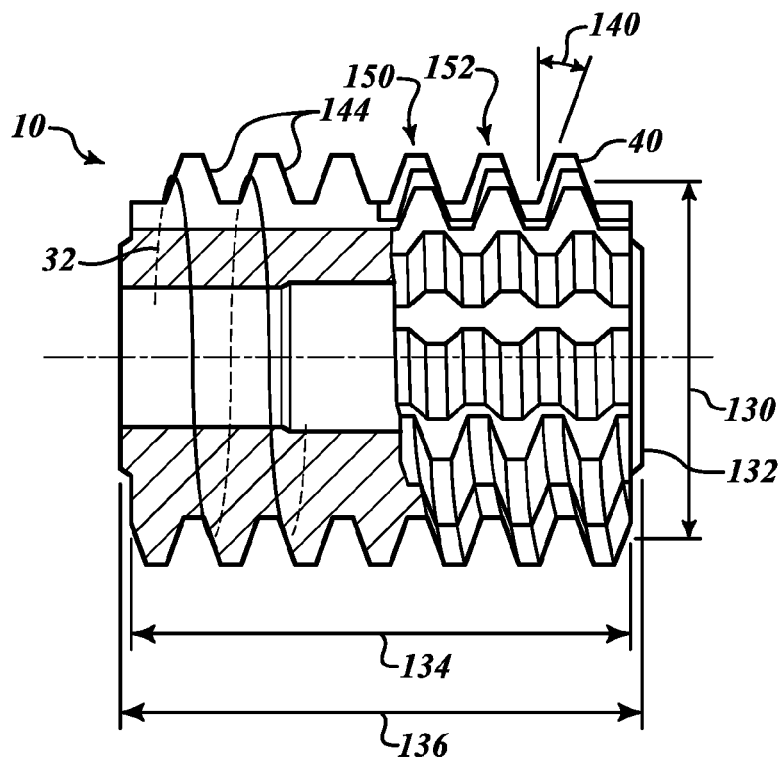
FIG. 4 is another side perspective view of the hob of FIG. 1.
Figure 5:
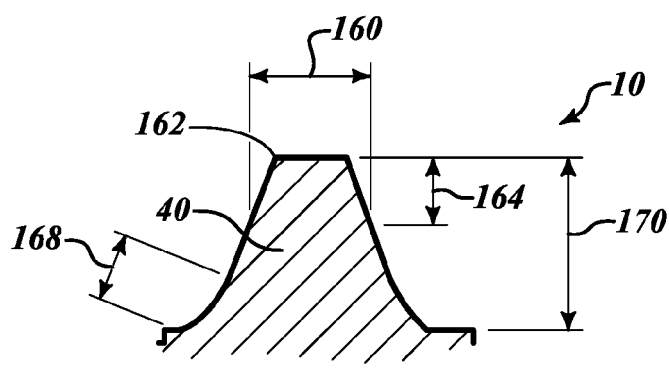
FIG. 5 is a detail view of one of the teeth extending from the hob of FIG. 4.

With additional reference now to FIGS. 3-5, additional features of the hob 10 will be described. The hob 10 can define a hole diameter 100 formed through the cylindrical hob body 32. The hob 10 can define an outside diameter 110. Gash spacing 120 can be radially defined between adjacent flutes 74 and 78. Each hob tooth 40 can include a radial cutting face 122 and a cam 124.

The hob 10 can further define a pitch diameter 130, a hub 132, a cutting face width 134 and a hob length 136. A pressure angle 140 can be defined by the hob teeth 40. Adjacent teeth 40 can define a lead 144. A first thread 150 and a second thread 152 (FIG. 6) can further be provided on the hob 10. With specific reference to FIG. 5, a hob tooth 40 can further include a tooth thickness 160, a tip radius 162, a hob addendum 164, and a tip relief modification 168. A whole depth of cut 170 can be defined by each tooth 40.

Figure 6:
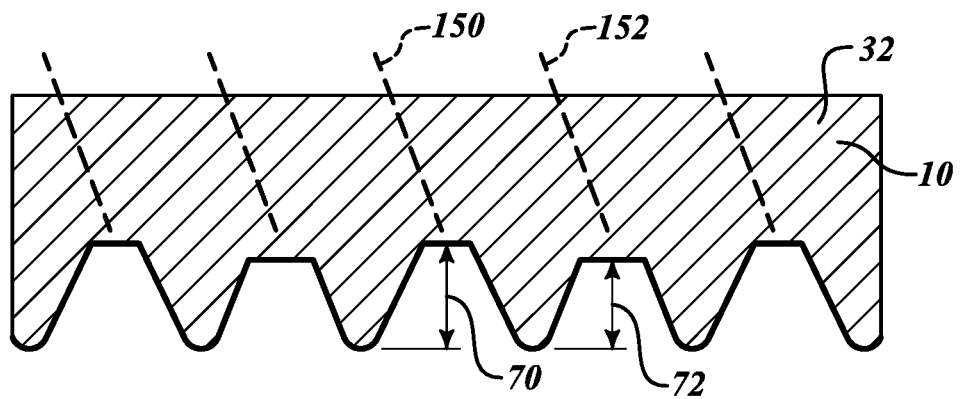
FIG. 6 is a sectional view of the hob illustrating adjacent whole depths defined by adjacent teeth on the hob.
Figure 7:
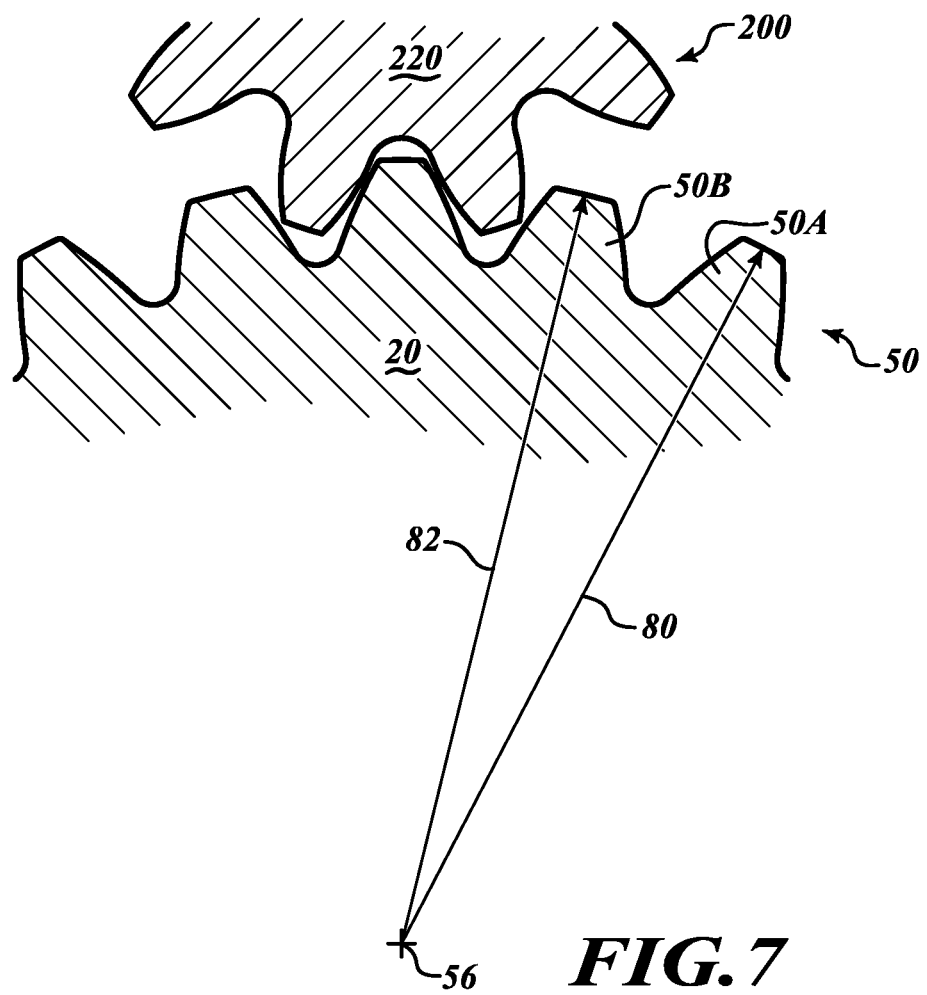
FIG. 7 is a plan view of a resulting gear formed by the hob of FIG. 1 and shown meshing with an adjacent second gear according to one example of the present disclosure.

Turning now to FIG. 6, the first thread 150 and the second thread 152 are shown on the cylindrical body 32 of the hob 10. The threads 150 and 152 generally define a lead angle of the cutting action of the hob 10. Turning now to FIG. 7, the hob 10 is configured to form the gear 20 having adjacent teeth 50 (such as teeth 50A and 50B) having distinct diameters 80 and 82. In the example shown, the diameter 80 is larger than the diameter 82. Because the teeth 50A and 50B, alternately formed around the gear 20 have distinct diameters, they will have distinct engagement points on mating teeth 200 of a corresponding conventional gear 220 where the teeth 200 have common diameters. In this regard, the meshing event can have different resonant frequencies created allowing for a quieter engagement between the respective gears 50 on the gear 20 and the gear teeth 200 on the gear 220.

A method for producing the gear 20 using the hob 10 according to one example of the present disclosure will now be described. At the outset the hob 10 is selected having characteristics suitable for producing the desired gear 20. In this regard, the hob 10 is selected having a desired pitch diameter 130, cutting face width 134, hob length 136, pressure angle 140, tooth thickness 160, tip radius 162, hob addendum 164, tip relief modification 168 and whole depth of cut 170 for each resulting tooth. The first series of hob teeth 40A have the whole depth 70 that is greater than the whole depth 72 provided by the alternating second series of teeth 40B.

The hob spindle 30 can be fixed for rotation around the axis 36. The hob spindle 30 can be rotated by a drive motor (not specifically shown). The work piece spindle 60 can be fixed for rotation around the gear axis 56. The hob 10 is translated across a circumferential face of the work piece 22 while the hob 10 rotates about the axis 36 and the work piece 22 rotates about the axis 56. The first and second series of hob teeth 40A and 40B have distinct whole depths 70 and 72. The first and second series of hob teeth 40A and 40B cut the work piece 22 creating the gear 20 having alternating gear teeth 50A and 50B. The gear teeth 50A and 50B have distinct outer diameters.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gear hobbing apparatus for producing a gear from a blank, the gear hobbing apparatus comprising:
   a hob having a cylindrical hob body;
   a first series of hob teeth extending from the cylindrical hob body and having a first whole depth; and
   a second series of hob teeth alternately extending from the cylindrical hob body with the first series of hob teeth and having a second whole depth;
   wherein the first and second series of hob teeth are configured to form the gear with circumferentially alternating first and second type gear teeth, the first type of gear teeth having a first outer diameter extending from an axis of rotation of the gear to the outer tips of the first type of gear teeth, and the second type of gear teeth having a second outer diameter that is smaller than the first outer diameter, the second outer diameter extending from the axis of rotation of the gear to the outer tips of the second type of gear teeth.

2. The gear hobbing apparatus of claim 1, wherein the hob has a single start thread.

3. The gear hobbing apparatus of claim 1, wherein the hob has multiple start threads.

4. The gear hobbing apparatus of claim 1, wherein the hob has a first thread having a first rack profile and a second thread having a second rack profile, and wherein the first and second threads are distinct.

5. The gear hobbing apparatus of claim 4, wherein the first and second rack profiles are distinct.

6. The gear hobbing apparatus of claim 1, wherein the first and second series of hob teeth each have rounded tips.

7. The gear hobbing apparatus of claim 1, further comprising:
first and second types of flutes defined between adjacent first and second hob teeth of the first and second series of hob teeth, wherein
the first type of flute has a first root diameter that is measured from a hob axis of rotation; and
the second type of flute has a second root diameter, which is larger than the first root diameter and is measured from the hob axis of rotation; and
the first type of flute facilitates forming the first type of gear teeth and the second type of flute facilitates forming the second type of gear teeth.

8. The gear hobbing apparatus of claim 7, wherein the second root diameter is larger than the first root diameter.

9. The gear hobbing apparatus of claim 7, wherein the first and second type of flutes alternate along a length of the cylindrical hob body.

10. A method of producing a gear from a gear blank having a gear blank axis, the method consisting of:
providing a hob having (i) a cylindrical hob body having a hob axis, (ii) a first series of hob teeth extending from the cylindrical hob body and having a first whole depth, and (iii) a second series of hob teeth alternately extending from the cylindrical hob body with the first series of hob teeth and having a second whole depth, wherein the first and second whole depths are distinct;
translating the hob across a circumferential face of the gear blank, wherein the hob rotates about the hob axis and the gear blank rotates about a gear axis; and
cutting the gear blank with the first and second series of hob teeth such that the gear has alternating first and second type gear teeth, the first type of gear teeth having a first outer diameter extending from the gear axis to the outer tips of the first type of gear teeth, and the second type of gear teeth having a second outer diameter that is smaller than the first outer diameter, the second outer diameter extending from the gear axis to the outer tips of the second type of gear teeth.

11. The method of claim 10, wherein the hob has a single start thread.

12. The method of claim 10, wherein the hob has multiple start threads.

13. The method of claim 10, wherein the hob has a first thread having a first rack profile and a second thread having a second rack profile, and wherein the first thread and the second threads are distinct.

14. The method of claim 10, wherein the first and second rack profiles have different shapes.

15. A gear hobbing apparatus for producing a gear from a blank, the gear hobbing apparatus comprising:
a hob having a cylindrical hob body and a hob axis about which the hob rotates;
a first set of hob teeth extending from the cylindrical hob body and having a first diameter measured from the hob axis to the outer tips of the first set of hob teeth;
a second set of hob teeth extending from the cylindrical hob body and having a second diameter measured from the hob axis to the outer tips of the second set of hob teeth;
first and second flutes alternately defined between adjacent first and second hob teeth of the first and second sets of hob teeth,
the first flutes each having a first root diameter measured from the hob axis; and the second flutes each having a second root diameter measured from the hob axis;
wherein the first and second flutes and the first and second sets of hob teeth are configured to form the gear with both a first type of gear teeth having a first outer diameter extending from an axis of rotation of the gear to the outer tips of the first type of gear teeth, and a second type of gear teeth having a second outer diameter that is a different length than the first outer diameter, the second outer diameter extending from the axis of rotation of the gear to the outer tips of the second type of gear teeth.

16. The gear hobbing apparatus of claim 15, wherein the hob has a single start thread.

17. The gear hobbing apparatus of claim 15, wherein the hob has multiple start threads.

18. The gear hobbing apparatus of claim 15, wherein the hob has a first thread having a first rack profile and a second thread having a second rack profile, and wherein the first and second threads are distinct.

19. The gear hobbing apparatus of claim 18, wherein the first and second rack profiles have different shapes.

* * * * *